US012720254B2

(12) United States Patent
Kaetel

(10) Patent No.: US 12,720,254 B2
(45) Date of Patent: Aug. 25, 2026

(54) APPARATUS AND METHOD FOR GENERATING A FIRST CONTROL SIGNAL AND A SECOND CONTROL SIGNAL BY USING A LINEARIZATION AND/OR A BANDWIDTH EXTENSION

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 335 days.

(21) Appl. No.: 18/481,403

(22) Filed: Oct. 5, 2023

(65) Prior Publication Data

US 2024/0040303 A1 Feb. 1, 2024

Related U.S. Application Data

(63) Continuation of application No. PCT/EP2022/059307, filed on Apr. 7, 2022.

(30) Foreign Application Priority Data

Apr. 13, 2021 (DE) ..................... 10 2021 203 640.6

(51) Int. Cl.
*H04S 3/02* (2006.01)
*H04R 1/22* (2006.01)
(Continued)

(52) U.S. Cl.
CPC ........... *H04R 1/225* (2013.01); *H04R 1/2873* (2013.01); *H04S 7/301* (2013.01)

(58) Field of Classification Search
CPC .......... H04R 1/2873; H04R 3/04; H04R 5/02; H04R 5/04; H04S 7/301; H04S 3/02
(Continued)

(56) References Cited

U.S. PATENT DOCUMENTS

| | | | |
|---|---|---|---|
| 5,862,228 | A | 1/1999 | Davis |
| 10,231,054 | B2 | 3/2019 | Kaetel |

(Continued)

FOREIGN PATENT DOCUMENTS

| | | | |
|---|---|---|---|
| DE | 102013221754 | A1 | 4/2015 |
| EP | 3061266 | | 8/2016 |

(Continued)

OTHER PUBLICATIONS

International Search Report and Written Opinion dated Jul. 18, 2022, issued in application No. PCT/EP2022/059307.

*Primary Examiner* — George C Monikang
(74) *Attorney, Agent, or Firm* — McClure, Qualey & Rodack, LLP

(57) ABSTRACT

An apparatus for generating a first control signal for a first transducer and a second control signal for a second transducer, including: an input interface providing a first audio signal for a first audio channel and a second audio signal for a second audio channel; a signal combiner for determining from the first audio signal and the second audio signal a combination signal including an approximate difference of the first audio signal and the second audio signal; a signal manipulator for manipulating the combination signal to obtain the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over the frequency of the second transducer.

25 Claims, 10 Drawing Sheets

(51) Int. Cl.

| | |
|---|---|
| ***H04R 1/28*** | (2006.01) |
| ***H04R 3/04*** | (2006.01) |
| ***H04R 5/02*** | (2006.01) |
| ***H04R 5/04*** | (2006.01) |
| ***H04S 7/00*** | (2006.01) |

(58) Field of Classification Search
USPC .......................................... 381/17–19, 22–23
See application file for complete search history.

(56) References Cited

U.S. PATENT DOCUMENTS

| | | | |
|---|---|---|---|
| 2008/0118072 A1 | 5/2008 | Tsutsui et al. | |
| 2009/0169032 A1 | 7/2009 | Choi | |
| 2014/0355765 A1 | 12/2014 | Kulavik et al. | |
| 2017/0223477 A1 | 8/2017 | Chon et al. | |
| 2019/0306626 A1 * | 10/2019 | Warner .................... | H04R 5/02 |

FOREIGN PATENT DOCUMENTS

| | | |
|---|---|---|
| EP | 2692144 B1 | 2/2017 |
| EP | 2692154 B1 | 9/2017 |
| EP | 2692151 B1 | 1/2018 |
| EP | 3061262 B1 | 1/2018 |
| WO | 2010105280 A1 | 9/2010 |

* cited by examiner (frequency response, second/fourth transducer)

(frequency response linearization filter)

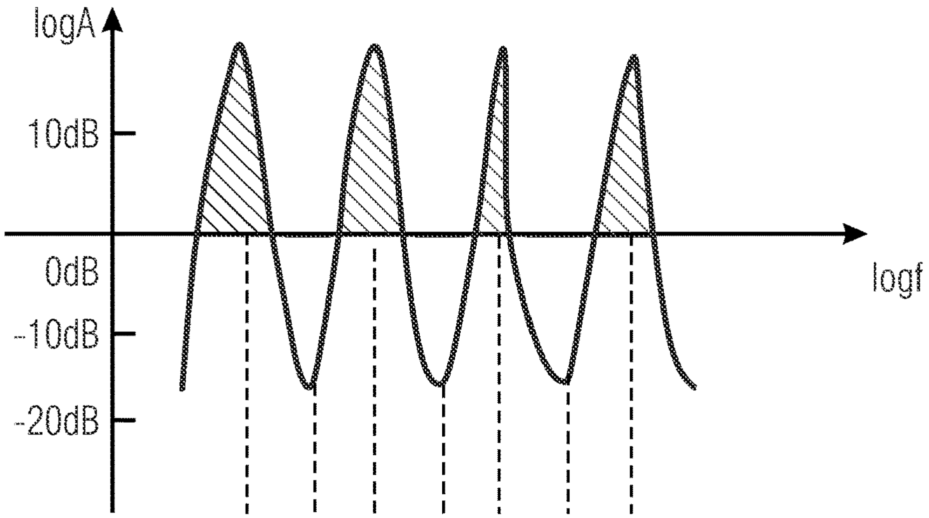
Fig. 8a (frequency response without linearization)
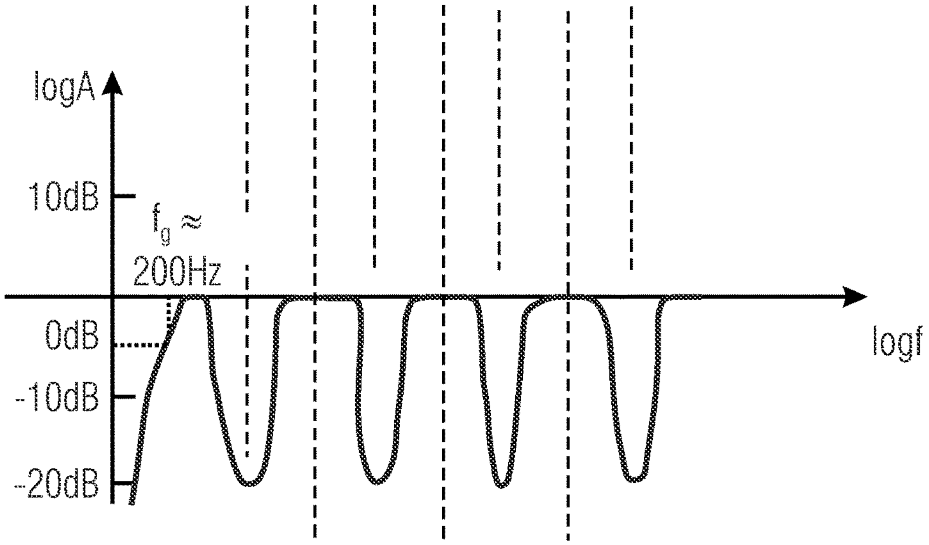
Fig. 8b (frequency response of the linearization filter)
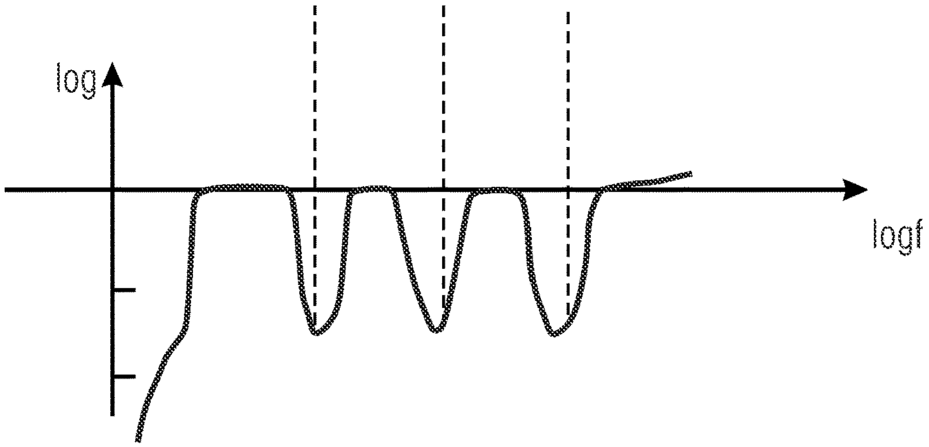
Fig. 8c (linearized frequency response)

APPARATUS AND METHOD FOR GENERATING A FIRST CONTROL SIGNAL AND A SECOND CONTROL SIGNAL BY USING A LINEARIZATION AND/OR A BANDWIDTH EXTENSION

CROSS-REFERENCES TO RELATED APPLICATIONS

This application is a continuation of copending International Application No. PCT/EP2022/059307, filed Apr. 7, 2022, which is incorporated herein by reference in its entirety, and additionally claims priority from German Application No. 10 2021 203 640.6, filed Apr. 13, 2021, which is incorporated herein by reference in its entirety.

The present invention relates to electroacoustics and in particular to concepts for generating and reproducing audio signals.

Typically, acoustic scenes are recorded using a set of microphones. Each microphone outputs a microphone signal. For example, 25 microphones may be used for an audio scene of an orchestra. A sound engineer then mixes the 25 microphone output signals, e.g., into a standard format such as a stereo format, a 5.1 format, a 7.1 format, a 7.2 format, or any other corresponding format. In case of a stereo format, e.g., the sound engineer or an automatic mixing process generates two stereo channels. In the case of a 5.1 format, mixing results in five channels and one subwoofer channel. Analogously, in case of a 7.2 format, e.g., mixing results in seven channels and two subwoofer channels. If the audio scene is to be rendered in a reproduction environment, a mixing result is applied to electrodynamic loudspeakers. In a stereo reproduction scenario, there are two loudspeakers, the first loudspeaker receiving the first stereo channel and the second loudspeaker receiving the second stereo channel. For example, in a 7.2 reproduction format, there are seven loudspeakers at predetermined positions, and two subwoofers, which can be placed relatively arbitrarily. The seven channels are applied to the corresponding loudspeakers, and the subwoofer channels are applied to the corresponding subwoofers.

The use of a single microphone arrangement when capturing audio signals, and the use of a single loudspeaker arrangement when reproducing the audio signals typically neglects the true nature of the sound sources. European patent EP 2692154 B1 describes a set for capturing and reproducing an audio scene, in which not only the translation but also the rotation and, in addition, the vibration is captured and reproduced. Thus, a sound scene is not only reproduced by a single capturing signal or a single mixed signal but by two capturing signals or two mixed signals that, on the one hand, are recorded simultaneously, and that, on the other hand, are reproduced simultaneously. This ensures that different emission characteristics of the audio scene are recorded compared to a standard recording, and are reproduced in a reproduction environment.

To this end, as is illustrated in the European patent, a set of microphones is placed between the acoustic scene and a (imaginary) listener space to capture the "conventional" or translation signal that is characterized by a high directionality, or high quality.

In addition, a second set of microphones is placed above or to the side of the acoustic scene to record a signal with lower quality, or lower directionality, that is intended to represent the rotation of the sound sources in contrast to the translation.

On the reproduction side, corresponding loudspeakers are placed at the typical standard positions, each of which has a omnidirectional arrangement to reproduce the rotation signal, and a directional arrangement to reproduce the "conventional" translational sound signal. In addition, there is a subwoofer at each of the standard positions, or there is only a single subwoofer at an arbitrary location.

European patent EP 2692144 B1 discloses a loudspeaker for reproducing, on the one hand, the translational audio signal and, on the other hand, the rotatory audio signal. Thus, the loudspeaker has, on the one hand, an arrangement that emits in an omnidirectional manner, and, on the other hand, an arrangement that emits in a directional manner.

European patent EP 2692151 B1 discloses an electret microphone that can be used for recording the omnidirectional or the directional signal.

European patent EP 3061262 B1 discloses earphones and a method for manufacturing earphones that generate both a translational sound field and a rotatory sound field.

European patent application EP 3061266 A0, which is intended for grant, discloses earphones and a method for producing earphones configured to generate the "conventional" translational sound signal by using a first transducer, and to generate the rotatory sound field by using a second transducer arranged perpendicular to the first transducer.

Recording and reproducing the rotatory sound field in addition to the translational sound field leads to a significantly improved and therefore high-quality audio signal perception that almost conveys the impression of a live concert, even though the audio signal is reproduced by the loudspeaker or headphones or earphones.

This achieves a sound experience that can almost not be distinguished from the original sound scene in which the sound is not emitted by loudspeakers but by musical instruments or human voices. This is achieved by considering that the sound is emitted not only translationally but also in a rotary manner and possibly also in a vibrational manner, and is therefore to be recorded and reproduced accordingly.

A disadvantage of the concept described is that recording the additional signal that reproduces the rotation of the sound field represents a further effort. In addition, there are many pieces of music, for example classical pieces or pop pieces, where only the conventional translational sound field has been recorded. Typically, the data rate of these pieces is heavily compressed, e.g., according to the MP3 standard or the MP4 standard, contributing to an additional deterioration of quality, however, which is typically only audible for experienced listeners. On the other hand, there are almost no audio pieces that have not been recorded at least in the stereo format, i.e. with a left channel and a right channel. Rather, the development goes towards generating more channels than only a left and a right channel, i.e. generating surround recordings with five channels or even recordings with higher formats, for example, which is known under the keyword MPEG surround or Dolby Digital in the technology.

Thus, there are many pieces that have been recorded at least in the stereo format, i.e. with a first channel for the left side and a second channel for the right side. There are even more and more pieces where recording has been done with more than two channels, e.g., for a format with several channels on the left side and several channels on the right side and one channel in the center. Even higher level formats use more than five channels in the horizontal plane and in addition also channels from above or channels from obliquely above and possibly also, if possible, channels from below.

However, all these formats have in common that they only reproduce the conventional translational sound by applying the individual channels to corresponding loudspeakers with corresponding transducers.

SUMMARY

An embodiment may have an apparatus for generating a first control signal for a first transducer and a second control signal for a second transducer, comprising: an input interface for providing a first audio signal for a first audio channel and a second audio signal for a second audio channel; a signal combiner for determining from the first audio signal and the second audio signal a combination signal comprising an approximate difference of the first audio signal and the second audio signal; a signal manipulator for manipulating the combination signal to acquire the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over the frequency of the second transducer, or wherein the apparatus is configured to convert at least a part of a spectrum of the first audio signal or the combination signal in a frequency range above 20 kHz to acquire the first control signal comprising the frequency range above 20 kHz.

Another embodiment may have a loudspeaker system, comprising: a first transducer, a second transducer, a third transducer, and a fourth transducer; and an apparatus for generating according to the invention, wherein the apparatus for generating is configured to: generate the first control signal for the first transducer by using the first audio signal, generate the second control signal for the second transducer by using the combination signal, generate a third control signal for the third transducer by using the second audio signal, and generate a fourth control signal for the fourth transducer by using a further combination signal, wherein the first transducer and the third transducer are configured to generate a translational sound signal, and wherein the second transducer and the fourth transducer are configured to generate a rotatory sound signal.

Another embodiment may have a method for generating a first control signal for a first transducer and a second control signal for a second transducer, comprising: providing a first audio signal for a first audio channel and a second audio signal for a second audio channel; determining from the first audio signal and the second audio signal a combination signal comprising an approximate difference of the first audio signal and the second audio signal; manipulating the combination signal to acquire the second control signal; and outputting or storing the first control signal based on the first audio signal, or the second control signal, wherein manipulating is configured to delay the combination signal or to amplify or attenuate the combination signal in a frequency-selective manner to counteract a non-linear transducer characteristic over the frequency of the second transducer, or wherein at least a part of a spectrum of the first audio signal or the combination signal is converted in a frequency range above 20 kHz to acquire the first control signal comprising the frequency range above 20 kHz.

Another embodiment may have a non-transitory digital storage medium having a computer program stored thereon to perform the method for generating a first control signal for a first transducer and a second control signal for a second transducer, comprising: providing a first audio signal for a first audio channel and a second audio signal for a second audio channel; determining from the first audio signal and the second audio signal a combination signal comprising an approximate difference of the first audio signal and the second audio signal; manipulating the combination signal to acquire the second control signal; and outputting or storing the first control signal based on the first audio signal, or the second control signal, wherein manipulating is configured to delay the combination signal or to amplify or attenuate the combination signal in a frequency-selective manner to counteract a non-linear transducer characteristic over the frequency of the second transducer, or wherein at least a part of a spectrum of the first audio signal or the combination signal is converted in a frequency range above 20 kHz to acquire the first control signal comprising the frequency range above 20 kHz, when said computer program is run by a computer.

The present invention is based on the finding that a synthetic generation of the rotation signal is possible if there is an audio piece with more than one channel, i.e. which already has two channels, e.g. stereo channels, or even more channels. According to the invention, calculating an at least approximate difference obtains at least an approximation with respect to the difference signal, or rotation signal, which may be used to drive an omnidirectional transducer, or one having lower directionality, so as to derive a rotation component from a signal that is actually only recorded translationally, and to reproduce it in the sound field.

The approximate difference signal is manipulated by a signal manipulator in order to obtain the second control signal for a rotatory transducer. In particular, the signal manipulation is done by delaying the combination signal and/or by amplifying or attenuating the combination signal in a frequency-selective manner so as to at least partially counteract a non-linear transducer characteristic over the frequency of the second transducer, i.e. the rotatory transducer. Alternatively or additionally, a bandwidth extension stage is provided for improving the reception quality, advantageously for the first control signal for the (normal) translational transducer and, according to the implementation, also for the third control signal for the second (conventional) translational transducer. On the other hand, the fourth control signal for the further rotatory transducer is again advantageously delayed and/or linearized by a linearization filter so as to at least partially compensate the typically heavily non-linear frequency response of the rotatory transducer.

According to the invention, in contrast to a conventional bandwidth extension, it is not the audible range, e.g. extending up to 20 kHz, that is targeted, but the non-audible range above it. In order to achieve a realistic sound perception, sound energy is emitted in the non-audible range above 20 kHz, wherein the signal for the sound energy in the non-audible range is derived from the audible sound signal by bandwidth extension, either of non-harmonic nature or advantageously of harmonic nature. Furthermore, in contrast to a conventional bandwidth extension, this synthetically generated non-audible spectrum is amplified instead of attenuated so as to again achieve that the typical conventional translational sound transducers still emit enough sound energy in the non-audible range, although the emission efficiency typically decreases towards frequencies above 30 to 40 kHz. However, it is advantageous to emit sound signals up to 80 kHz.

Although these sound signals are not directly audible, they still have a decisive effect with respect to the quality of the audible signal since the harmonics spectrum at these high frequencies is used to condition the air, so to speak, so that sound signals with lower frequencies in the harmonics spectrum can better propagate through the air. This achieves the "jungle" effect for certain sound signals, which is characterized in that certain e.g. very insistent sounding parrots are audible over a very long distance, although this should not be the case according to the normal laws of propagation, according to which the sound energy decreases as the square of the distance. These particularly good propagation characteristics of such natural signals are due to the fact that the audio signals have a particularly powerful harmonics component that reaches very high frequencies, which is used to achieve the above-mentioned air pre-conditioning. For example, it is similar for certain percussive instruments in the orchestra, such as a triangle. Although it does not generate a particularly high sound pressure level, it can be heard particularly clearly even at a considerable distance, e.g. even in the back rows of a concert hall. This also assumes that this particularly good audibility is achieved by conditioning the air in which the audible sound waves propagate by means of a particularly strong harmonics content so that the decrease in volume proportionally to the square of the distance is compensated by energy from the harmonics so that certain signals rich in harmonics carry particularly far and are at the same time clearly audible despite the great distance from the sound source.

In advantageous embodiments of the present invention, a delay is carried out so as to delay the rotation signal with respect to the translational signal in order to use the precedence effect, or the Haas effect. The delay in the magnitude of 10 to 40 ms needed achieves that, according to the principle of the first wave front, the localization of the sound source by a listener takes place on the basis of the translational signal that carries the directional information. At the same time, the rotational signal does not interfere with the directional perception, however, at the same time leads to a high-quality and life-like audio signal experience due to the excitation of rotating sound particle velocity vectors in the sound field by the corresponding second and fourth transducers that reproduce the second and fourth control signals, respectively. Due to the Haas effect, the listener thinks that the rotating components of the sound field originate from the source whose translational sound field has reached the listener's ear shortly before.

In advantageous embodiments, only a coarse linearization of the typically heavily non-linear frequency response of the transducer, or transducer system, is carried out in the linearization filter for the reproduction of the rotatory sound field. A non-linear emission characteristic, or a non-linear frequency response, is typically characterized by overshoots and cancellations. According to the invention, however, the linearization filter is only configured to reduce overshoots partially or advantageously completely, however, to leave the cancellations almost untouched so as to avoid potentially disturbing artifacts by avoiding a strong amplification in the cancellations that would otherwise be required. It has been found that the quality of a rotating sound field is not noticeably affected if, due to the cancelations still present as a result of comb filter effects potentially occurring in the transducers for the rotational sound, certain tones are missing in the part of the sound filter comprising rotating sound particle velocity vectors. In contrast, the attenuation of the overshoots prevents the rotating component of the sound field from being perceived as unnatural. In order to obtain a favorable setting of the linearization filter, it is advantageous in certain embodiments to record the reproduction or frequency response characteristic of the rotatory transducer by measurement and to then set the linearization filter for the control signal for this transducer on the basis of the performed measurement. However, it is also possible to set a prototype linearization characteristic that is predetermined for certain transducer classes, which provides usable results even if the actual second, or fourth, transducer does not fully match the prototype characteristic.

Advantageously, the apparatus for generating the first control signal for the first transducer and the second control signal for the second transducer also comprises means to generate a control signal for the third and the fourth transducers to achieve, e.g., a stereo reproduction over loudspeakers. If more than two channels are to be reproduced, further control signals are generated, e.g., for a left rear loudspeaker, a right rear loudspeaker, and a center loudspeaker. Then, a transducer for the translational sound and a transducer for the rotatory sound will be provided at each location of the standardized loudspeaker output format, and the control signal for the rotatory sound generated synthetically according to the invention is determined for each individual loudspeaker position or is derived from one and the same manipulated combination signal, according to the effort of the corresponding embodiment.

Advantageous embodiments provide an interface that receives a first electric signal, e.g. for a left channel, and a second electric signal, e.g. for a right channel. The signals are supplied to a signal processor in order to reproduce the first electric signal for the first transducer and the second electric signal for a third transducer. These transducers are the conventional transducers. In addition, the signal processor is configured to calculate the at least approximate difference from the first electric signal and the second electric signal and to determine from this difference a third electric signal for a second transducer or a fourth electric signal for a fourth transducer.

In an embodiment, the signal processor is configured to output the first electric signal for the first transducer and the second electric signal for the third transducer, and to calculate a first at least approximate difference from the first electric signal and the second electric signal, and to calculate a second at least approximate distance from the first electric signal and the second electric signal, and to output a third electric signal for the second transducer on the basis of the first at least approximate difference and to output a fourth electric signal for the fourth transducer on the basis of the second at least approximate difference. Advantageously, the difference is a precise difference where the second signal is changed by 180° and is added to the first signal. If this signal is the first at least approximate difference, the different second at least approximate difference is what results if the first signal is phase-shifted by 180°, i.e. is applied with a "minus" and the unchanged second signal is added thereto. Alternatives consist of calculating the first at least approximate difference and applying thereto a phase shift of 180°, for example, in order to calculate the second at least approximate difference. Then, the second at least approximate difference is directly determined from the first at least approximate difference. Alternatively, both differences may be determined independently, i.e. both from the original first and second electric signals, that is the left and the right input signals.

Ideally, the difference is a value that is obtained if a first channel is subtracted from the second channel, or vice versa. However, an at least approximate difference also results and is useful in certain embodiments if the phase shift is not 180°, but larger than 90° and smaller than 270°. In the even more advantageous range, which is smaller, the phase shift has a phase value of between 160° and 200°.

In an embodiment, one of the two signals may be subjected to a phase shift equal to or different from 180° before the difference is formed, and, possibly, to frequency-dependent processing before addition, e.g. by means of equalizer processing or frequency-selective or non-frequency-selective amplification. Further processing performed either before or after calculating the difference consist of high-pass filtering. If a high-pass filtered signal is combined with the other signal, e.g., with an angle of 180°, this is also an at least approximate difference. The difference calculated at least approximately in order to generate therefrom the signal for exciting rotation waves in corresponding transducers separate from the conventional transducers may be approximated by not changing the values of the two signals and by varying the phase between the two signals between an angle of between 90° and 270°. For example, an angle of 180° may be used. The amplitudes of the signals may be varied in a frequency-selective or non-frequency-selective manner. Combinations of frequency-selectively or non-frequency-selectively varied amplitudes of the two electric signals together with an angle of between 90° and 270° also lead to a rotation excitation signal for the separate rotation transducer, i.e. the second transducer on the left side and the second transducer on the right side, that is useful in many cases.

The difference signal for the one side and the different difference signal for the other side are advantageously used for loudspeakers that are remote from the listener's head. Each of these loudspeakers has at least two transducers that are fed with different signals, wherein the first loudspeaker for the "left side" has a first transducer that is fed with the original left signal, or a possibly delayed left signal, whereas the second transducer is fed with the signal derived from the first at least approximate difference. The individual transducers of the second loudspeaker for the "right side" are driven accordingly.

In a further embodiment where there are more than two channels, i.e. for example in case of a 5.1 signal, the signal processor or the interface has connected upstream thereto a down-mixer for the first electric signal, i.e. for the left channel, and a further down-mixer for the second electric signal, i.e. for the right channel. However, if the signal is available as an original microphone signal, e.g. as an ambisonics signal with several components, each down-mixer is configured to calculate a left or right channel from the ambisonics signal accordingly, which is then used by the signal processor to calculate the third electric signal and the fourth electric signal on the basis of at least approximate differences.

BRIEF DESCRIPTION OF THE DRAWINGS

Embodiments of the present invention will be detailed subsequently referring to the appended drawings, in which:

FIG. 8*a* shows a schematic illustration of another non-linear frequency response of a rotatory transducer;

FIG. 8*b* shows a schematic illustration of a frequency response of a linearization filter; and FIG. 8*c* shows a schematic illustration of a linearized frequency response due to the linearization filter and the rotatory sound transducers used.

DETAILED DESCRIPTION OF THE INVENTION

Figure 1:
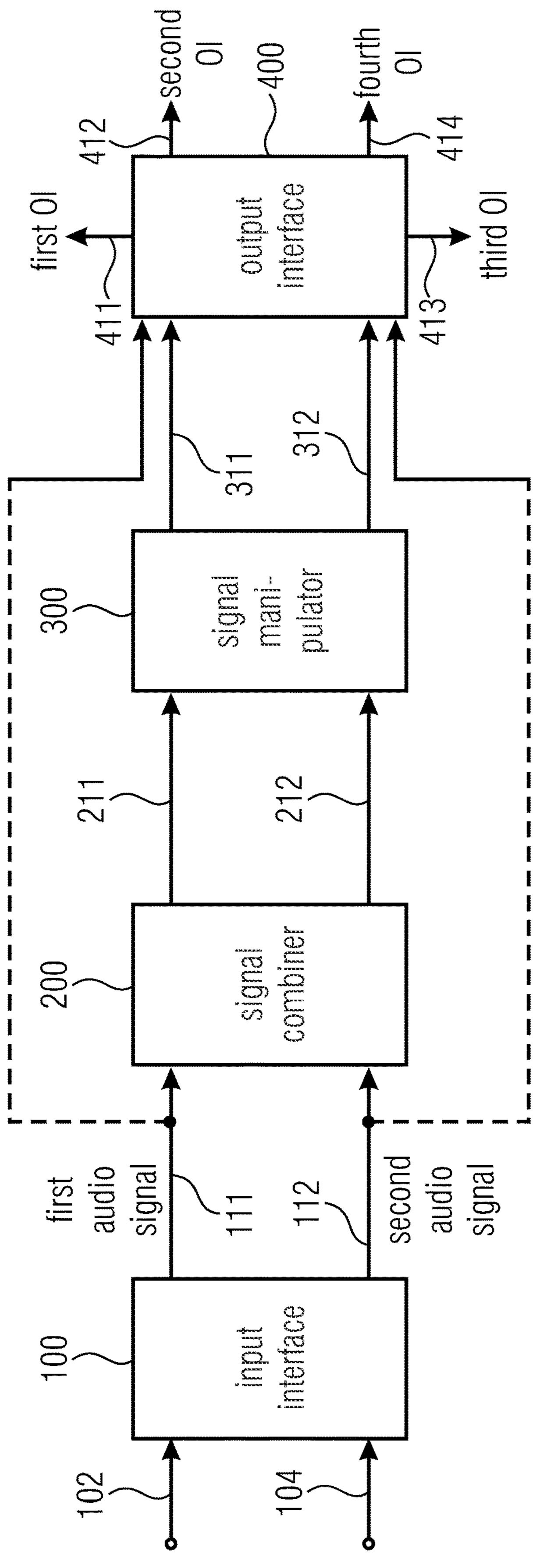
FIG. 1 shows an apparatus for generating a first control signal and a second control signal according to an embodiment of the present invention.

FIG. 1 shows an apparatus for generating a first control signal 411 for a first transducer and a second control signal 412 for a second transducer. The apparatus includes an input interface 100 for providing a first audio signal 111 for a first audio channel and a second audio signal for a second audio channel. In addition, the apparatus includes a signal combiner 200 for determining from the first audio signal 111 and the second audio signal 112 a combination signal including an approximate difference of the first audio signal 111 and the second audio signal 112. This combination signal is shown at 211.

In advantageous embodiments, the signal combiner is further configured to generate a further combination signal 212 that also represents a difference between the first and the second audio signal and is derived from the first audio signal and the second audio signal or from the first combination signal 211. In embodiments, the second combination signal 212 differs from the first combination signal 211 and differs, in particular, by 180 degrees, i.e. it has an opposite sign.

Similar to the advantageously used further combination signal 212, the combination signal 211 is also supplied to a signal manipulator 300 configured to manipulate the combination signal in order to obtain therefrom a manipulated combination signal, illustrated at 311 and corresponding to the second control signal 412. In special embodiments, the second control signal 412 is therefore transmitted from the signal manipulator by using the output interface 400 and is output or stored by the output interface. Furthermore, the output interface is configured to output the first control signal 411 for the first transducer in addition to the second control signal for the second transducer as well. The first control signal 411 is obtained by the output interface directly from the input interface and corresponds to the first audio signal 111, or is derived by the output interface 400 from the first audio signal, e.g., by using a bandwidth extension stage, i.e. a spectral enhancer, described later.

In advantageous embodiments, the signal manipulator 300 is configured to delay the combination signal, i.e. to feed it into a delay stage, or to amplify or attenuate the combination signal in a frequency-selective manner, i.e. to feed it into a linearization filter, in order to at least partially counteract a non-linear transducer characteristic over the frequency of the second transducer.

Alternatively or additionally, the output interface is configured to feed the first audio signal 111 into a bandwidth extension stage so as to obtain the first output signal 411. Therefore, the apparatus for generating a first control signal 411 and a second control signal 412 includes three aspects that may be used together or independent from one another.

The first aspect consists of generating the manipulated signal from the combination signal by using a delay, which utilizes the Haas effect.

The second aspect consists of the signal manipulator 300 using the linearization filter in order to at least partially compensate a heavily non-linear frequency response of the "rotatory" transducer in the sense of a "predistortion". The third aspect consists of the signal manipulator performing any other type of manipulation such as an attenuation or high-pass filtering or any other processing, wherein the output interface performs a bandwidth extension for the first audio signal.

This bandwidth extension using a bandwidth extension stage is particular in that at least a part of a spectrum of the first audio signal in a frequency range above 20 kHz is converted by using an amplification factor of more than 1 or equal to 1, i.e. without amplification, in order to obtain the first control signal including the frequency range above 20 kHz. In contrast to a conventional bandwidth extension, which is typically configured to extend a signal band-limited to perhaps 4 or 8 kHz in a frequency range of up to perhaps 16 or 20 kHz, further using attenuation to synthesize a decreasing performance characteristic of an audio signal, the inventive bandwidth extension differs in that it determines spectral values for a frequency range above 20 kHz, i.e. for an inaudible range, and in that this spectral range is not attenuated, but converted amplification factor larger than 1 or equal to 1 in order to bring into the non-audible spectral range signal energy that is then radiated by the membranes of the corresponding transducers in order to provide a high-quality audio signal experience. This audio signal experience consists of "conditioning", so to speak, the air carrying the sound energy in the audible range by sound energy in the non-audible range so that certain signals very rich in harmonics are clearly audible despite a great distance, such as the scream of the parrot in the jungle or a triangle in an orchestra.

In advantageous embodiments, all three aspects are implemented, as will be described later. However, only one aspect of the three aspects can be implemented, or any two aspects of the three aspects.

Advantageously, the first input signal 102 and the second input signal 104 introduced into the input interface 100 represent a left audio channel and a right audio channel. The first audio signal 411 and the second audio signal 412 then represent the control signals for the first and the second transducers placed on the left side with respect to a listening position. The apparatus for generating is further configured to generate the control signals, i.e. the third control signal 413 for a third transducer and the fourth control signal 414 for the fourth transducer, for the right side as well. The third control signal 413 is formed analogously to the first control signal 411, and the fourth control signal 414 is formed analogously to the second control signal 412. The first control signal 411 and the third control signal 413 are supplied to conventional translational transducers, and the control signals 412 and 414 are supplied to "rotatory" transducers, i.e. transducers that emit a sound field with rotating sound particle velocity vectors, as will be described with reference to FIG. 6.

Figure 2:
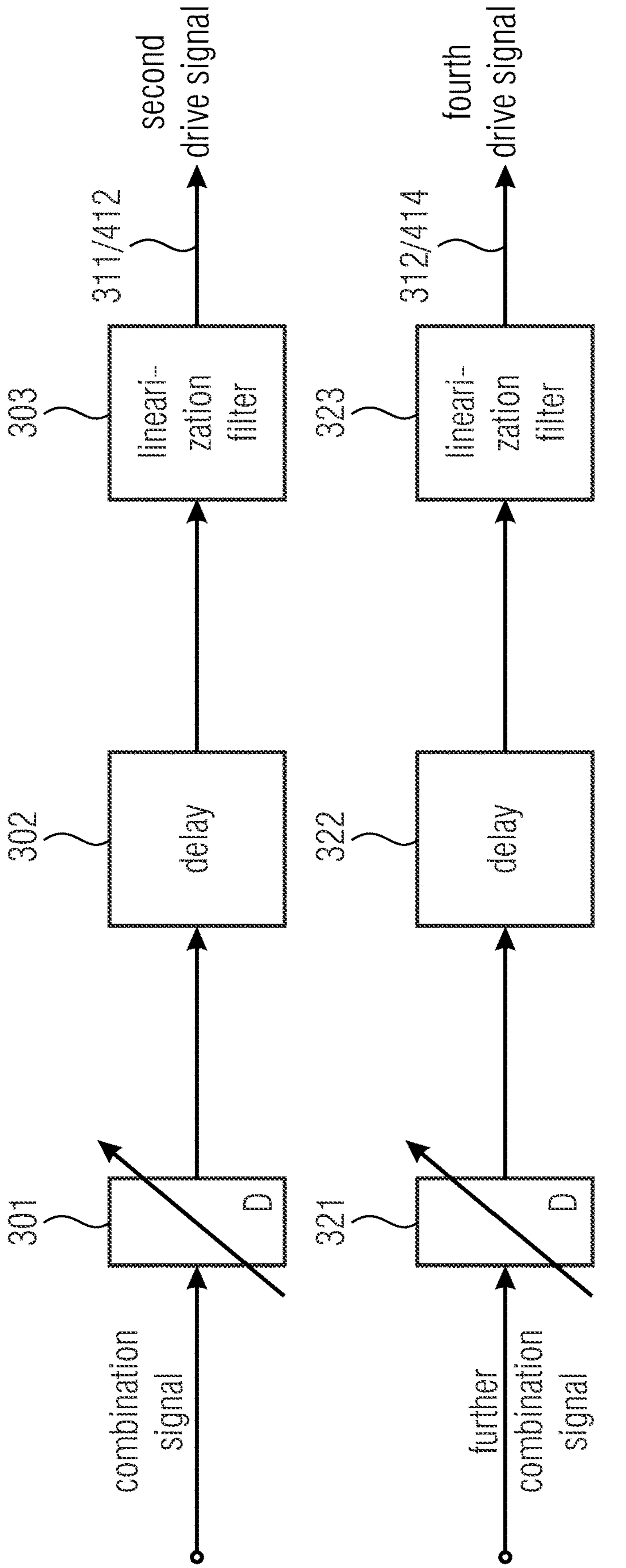
FIG. 2 shows a detailed illustration of the signal manipulator of FIG. 1 according to an advantageous embodiment.

FIG. 2 shows an advantageous implementation of the signal manipulator 300 in order to calculate the second control signal 311/412 from the combination signal 211. In addition, FIG. 2 also shows the implementation of the signal manipulator 300 in order to generate the fourth control signal 312 and 414 from the further combination signal 212. In order to generate the second control signal, in advantageous embodiments, the signal combiner includes a variable attenuation member 301, a delay stage 302, and a linearization filter 303. It is to be noted that the order of the blocks 301, 302, 303 is arbitrary. There may also be a single element that unites the functionalities of the linearization filter, the delay, and the attenuation. The attenuation may be adjusted, or is set to a predefined value that is between 3 and 20 dB, advantageously between 6 and 12 dB, e.g. at 10 dB.

Analogously, the signal manipulator 300 is configured to subject the combination signal 212 to an attenuation by an attenuation stage 321, to subject it to a delay 322, and to feed it into a linearization filter 323. All three elements may be integrated in a single filter that implements the attenuation that is typically constant across the entire frequency range, the delay that is also constant across the entire frequency range, and a linearization filter that attenuates, or amplifies, at least in a frequency-selective manner. It is to be noted that a partial set of the elements can be used as well, i.e. only attenuation and linearization without delay, or only delay without attenuation and linearization, or only attenuation without delay and linearization. In advantageous embodiments, all three aspects are implemented.

For the delay, in particular, a delay is used that is large enough that a precedence effect, or a Haas effect, or an effect of the first wave front, occurs between the non-delayed signal given by the first control signal 411, and the second control signal subject to the delay. The signal for the rotatory transducer, i.e. the second in control signal 412, is delayed such that a listener initially perceives the wave front due to the first control signal 411 and therefore carries out localization of the left channel. The rotatory component, which is essential for the audio quality, however, which does not carry any particular information with respect to the localization, is perceived slightly later and, due to the Haas effect, is not perceived as its own signal. Useful delay values for the delay stage 302 or 322 are advantageously between 10 and 40 ms, particularly advantageously between 25 ms and 35 ms, and in particular at 30 ms.

Figure 3:
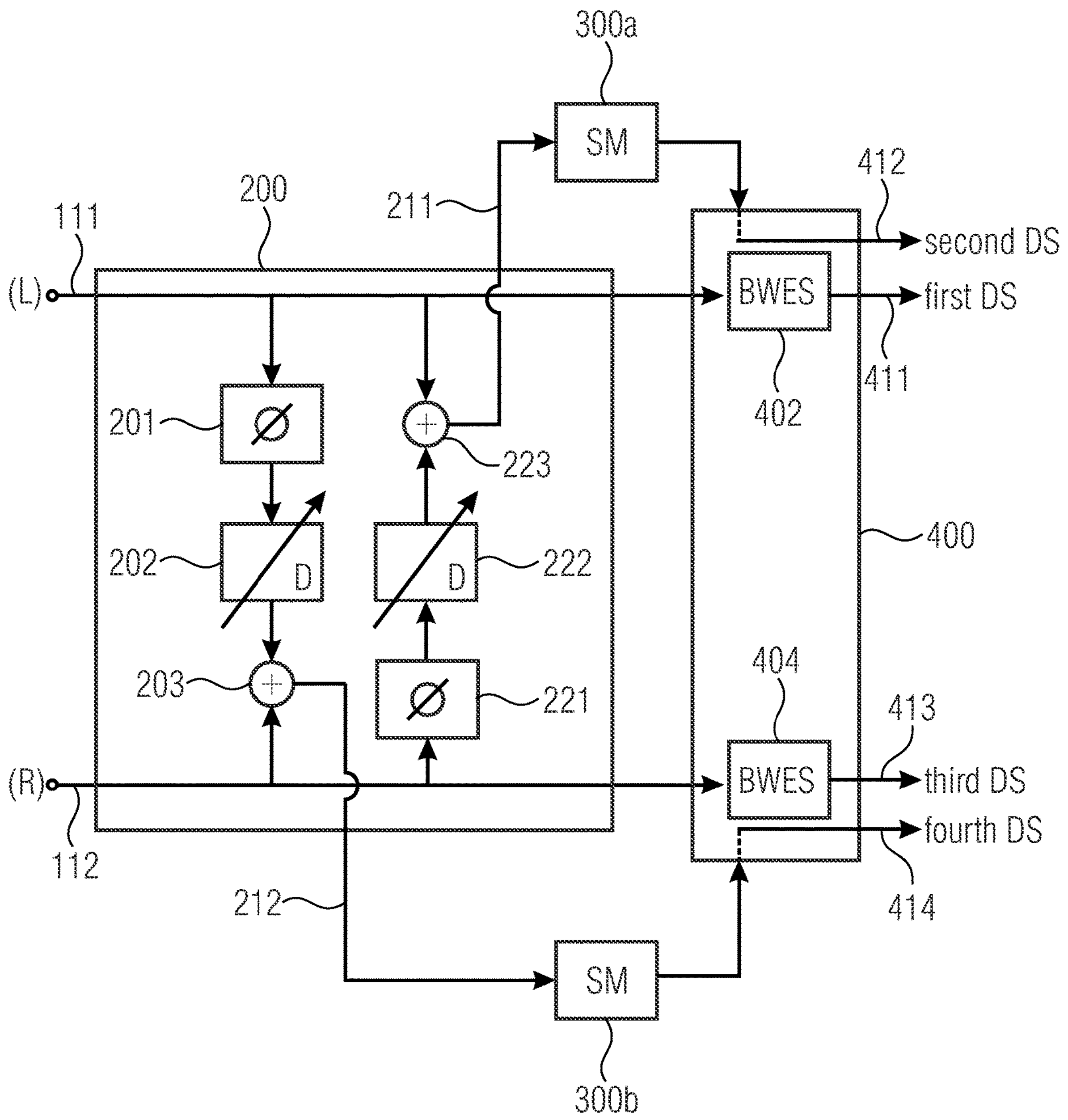
FIG. 3 shows a detailed illustration of the signal combiner of FIG. 1 according to an advantageous embodiment, as well as an illustration of incorporating a bandwidth extension stage for each control signal for a translational transducer.

FIG. 3 shows an advantageous implementation of the signal combiner 200 to calculate an approximate difference represented by the combination signal 211 or the further combination signal 212. To this end, the signal combiner 200 includes a phase shifter 201, a downstream attenuation member 202, and an adder 203. In addition, the first audio signal 111 and the second audio signal 112 are used. The first audio signal 111 is phase-shifted by the phase shifter 201, is attenuated depending on the setting of the attenuation member 202, and is then added to the first audio signal 112 in order to obtain the further combination signal 212. In addition, the signal combiner 200 includes a further adder 223, a further phase shifter 221, and a further attenuation member 222, wherein the second audio signal 112 is phase-shifted by the phase shifter 221, the phase-shifted signal is possibly attenuated and then combined with the first audio signal 111. If the phase shifters 201 and 221 carry out a phase shift by 180°, which is advantageous, and if the attenuation member 202, 222 are set such that the attenuation is zero, i.e. these potentiometers are "fully turned up", the combination signal 211 is the result of the subtraction of the second audio signal 112 from the first audio signal 111, i.e. when the first audio signal 111 is the left channel and the right audio signal 112 is the right channel, the combination signal 211 is L-R. Analogously, the further combination signal 212 is R-L in this example.

The implementation of a phase shift of 180° is achieved particularly easily by plugging in a corresponding jack carrying the audio signal in a "reverse" manner. Different phase shifts that differ from 180°, i.e. in a range of 150° to 210°, may also be achieved by correct phase shifter elements and may be of advantage in certain implementations. The same applies to certain attenuation settings of the attenuation members 202, 222, which, according to the implementation, are used to affect the combination signal in that, when forming the difference, the signal that is subtracted is attenuated in contrast to the signal from which the subtraction is carried out. Thus, a subtraction factor x between zero and 1 can be formed, as will be described in FIG. 6.

In addition to a special implementation of the signal combiner 200, FIG. 3 further shows an advantageous embodiment of the bandwidth extension of the translational signal, wherein this bandwidth extension is advantageously carried out in the output interface 400. To this end, the output interface 400 includes a first bandwidth extension stage 402 and a second bandwidth extension stage 404. The first bandwidth extension stage 402 is configured to subject the first audio signal 111 to a bandwidth extension in the non-audible range above 20 kHz, whereas the bandwidth extension stage 404 is configured to subject the second audio signal, i.e. the right channel for example, to a bandwidth extension in the non-audible range above 20 kHz as well.

The result of the bandwidth extension is the first audio signal for the first transducer, i.e. the rotatory transducer, e.g. on the left side with respect to a listening position, and the third control signal obtained at the output of the bandwidth extension stage 404 is the control signal for the translational transducer on the right side with respect to the listening position. Both control signals 411, 413 are now provided with signal energy at frequencies above 20 kHz, in contrast to the audio signals 111, 112, wherein these signal components are advantageously present in the control signals up to 40 kHz and particularly advantageously even up to 80 kHz or above.

Figure 4:
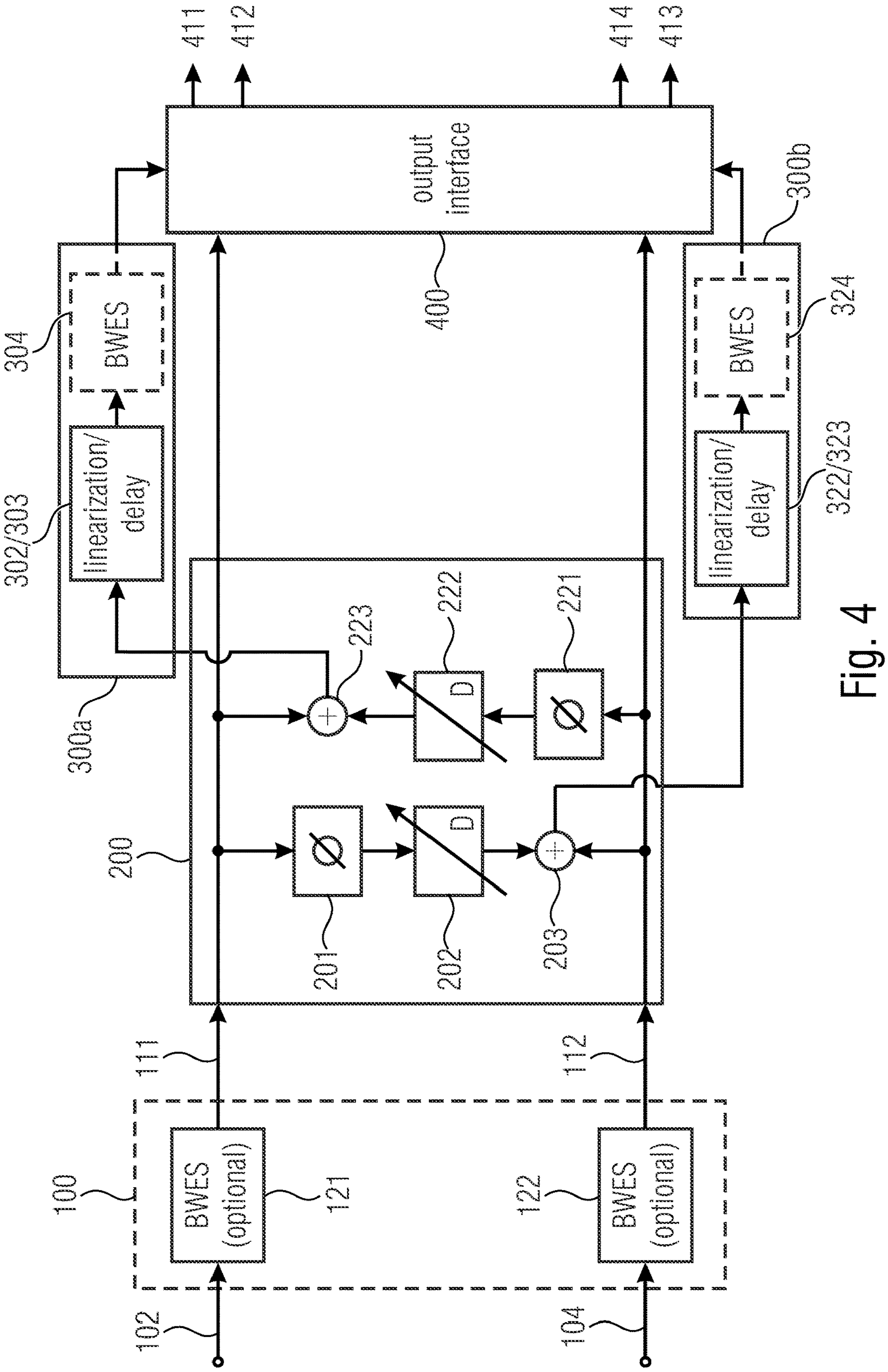
FIG. 4 shows an alternative implementation of the apparatus for generating with a different arrangement of the bandwidth extension stages compared to FIG. 3.

Even though FIG. 3 shows an implementation in which a bandwidth extension is only carried out with the translational signal, in other embodiments, a bandwidth extension may be carried out with the rotatory signal, as is illustrated at 304 and 324 in FIG. 4. Alternatively to the bandwidth extension stages 304, 324, a bandwidth extension could be provided in the input interface 100. To this end, a bandwidth extension stage 121 for a first input signal 102 is provided so as to generate the first audio signal 111 from the first input signal 102. In addition, the input stage 100 is provided in order to generate the second audio signal 112 from the second input signal 104. In contrast to the implementation of FIG. 3, these two audio signals have a frequency range that goes far beyond 20 kHz. If the bandwidth extension is already carried out in the input interface, further bandwidth extensions in the output interface 400, as is illustrated in FIG. 3, or in the signal manipulation elements 300*a*, 300*b* are not required, since all signals already have a high bandwidth in the subsequent signal processing. However, due to the efficiency of processing, an implementation as illustrated in FIG. 3 is advatangeous, wherein only the control signals for the translational transducers, i.e. the first control signal 411 and the third control signal 413, are subjected to the bandwidth extension, since the high frequencies are of particular significance for the propagation. Thus, all other processing stages can be performed in the input interface, in the signal combiner, and in the signal manipulator with the band-limited signal, saving processing resources, since all elements apart from the bandwidth extension stages 402, 404 in FIG. 3 can operate with band-limited signals.

Figure 5A:
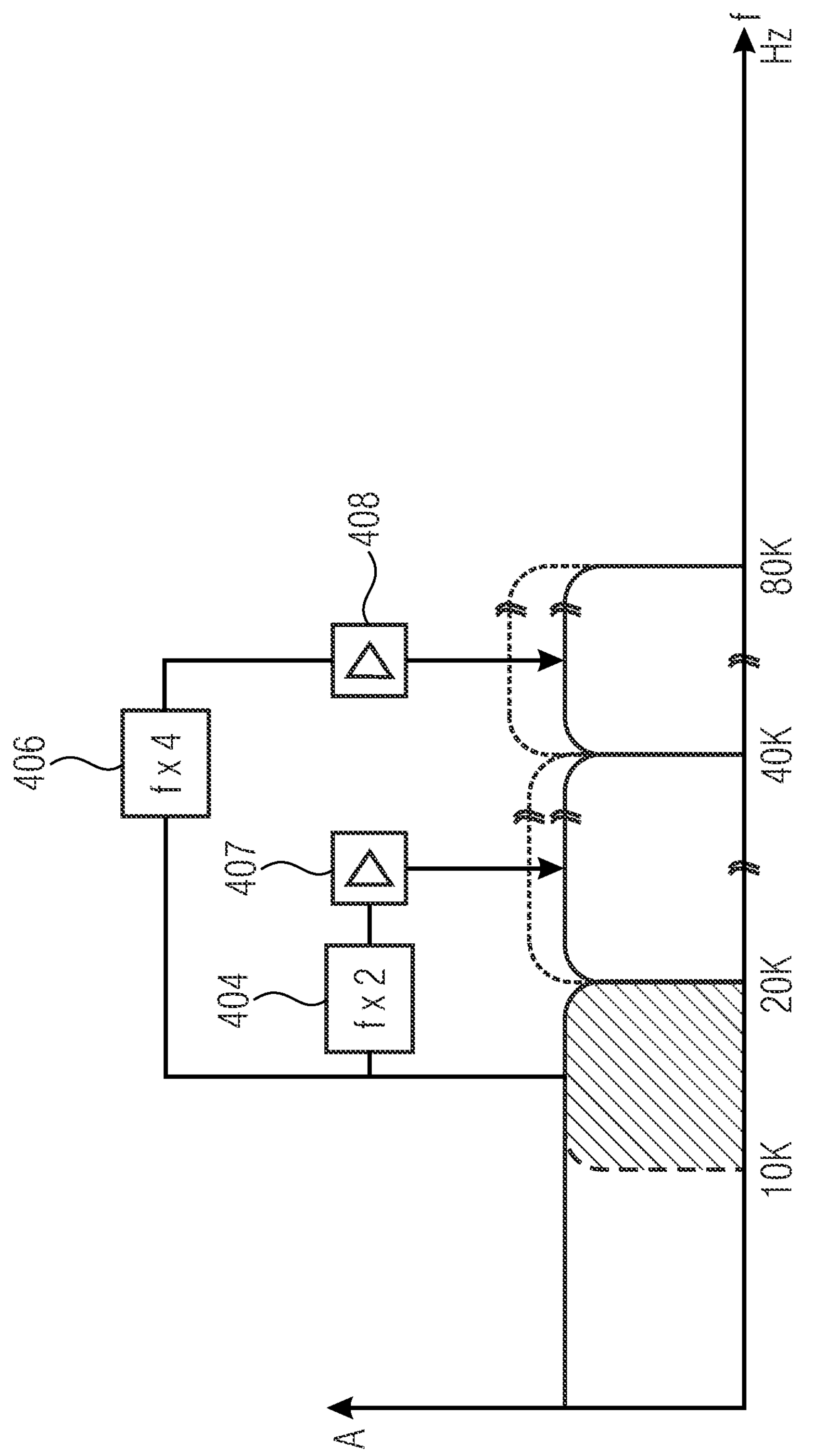
FIG. 5*a* shows a schematic illustration of the effect of a bandwidth extension stage according to an embodiment.

FIG. 5 shows a first implementation of the bandwidth extension stage 402, 404, or the optional elements 121, 122 or 304, 324 of FIG. 4. In particular, the bandwidth extension stage is configured to generate a bandwidth extension above the range of 20 kHz, i.e. in the non-audible range, which goes up to 80 kHz in FIG. 5*a*. To this end, advantageously, a harmonic bandwidth extension is carried out, wherein each frequency in the range between 10 and 20 kHz of the audio signal is multiplied with the factor 2, for example, in order to generate a frequency range of between 20 kHz and 40 kHz. In addition, an amplification by means of an amplification member 407 that implements an amplification of greater than 1, as is illustrated by the dotted line in FIG. 5*a*, is advantageously carried out in the bandwidth extension stage. The harmonic bandwidth extension unit 404 together with the amplifier 407 therefore generates in the corresponding audio signal a signal component that is between 20 and 40 kHz and even has a higher signal energy than the range from the baseband between 10 and 20 kHz. In order to reach an even higher range of between 40 kHz and 80 kHz, a further transposer 406 that multiplies the frequencies each with 4 is provided, wherein the output signal is again advantageously multiplied with an amplification factor of greater than 1, wherein this amplifier having the amplification factor of greater than 1 is shown at 408 in FIG. 5*a*. It is to be noted that the frequency axis is broken through at the corresponding positions, since the range between 40 kHz and 80 kHz is twice as long as the range between 20 kHz and 40 kHz, which is in turn twice as long as the range between 10 kHz and 20 kHz, due to the harmonic bandwidth extension by the elements 404, 406. Although transposing factors that are odd-numbered, i.e. 1, 3, 5 and 7, can be used in principle, it has been shown that even-numbered transposing factors, as achieved by the transposer 404, 406, generate a more realistic audio signal impression. In addition, according to the implementation, the baseband may not be attenuated and amplified, i.e. it is taken as it is. However, since loudspeakers typically have a lower transducer efficiency, or a decreasing with higher frequencies, at frequencies above 20 kHz, this lower, or decreasing, transducer efficiency is compensated with an amplified transposed spectral range. Thus, it is advantageous that the amplifier 408 for the range between 40 and 80 kHz amplifies more than the amplifier 407 for the range between 20 kHz and 40 kHz.

Figure 5B:
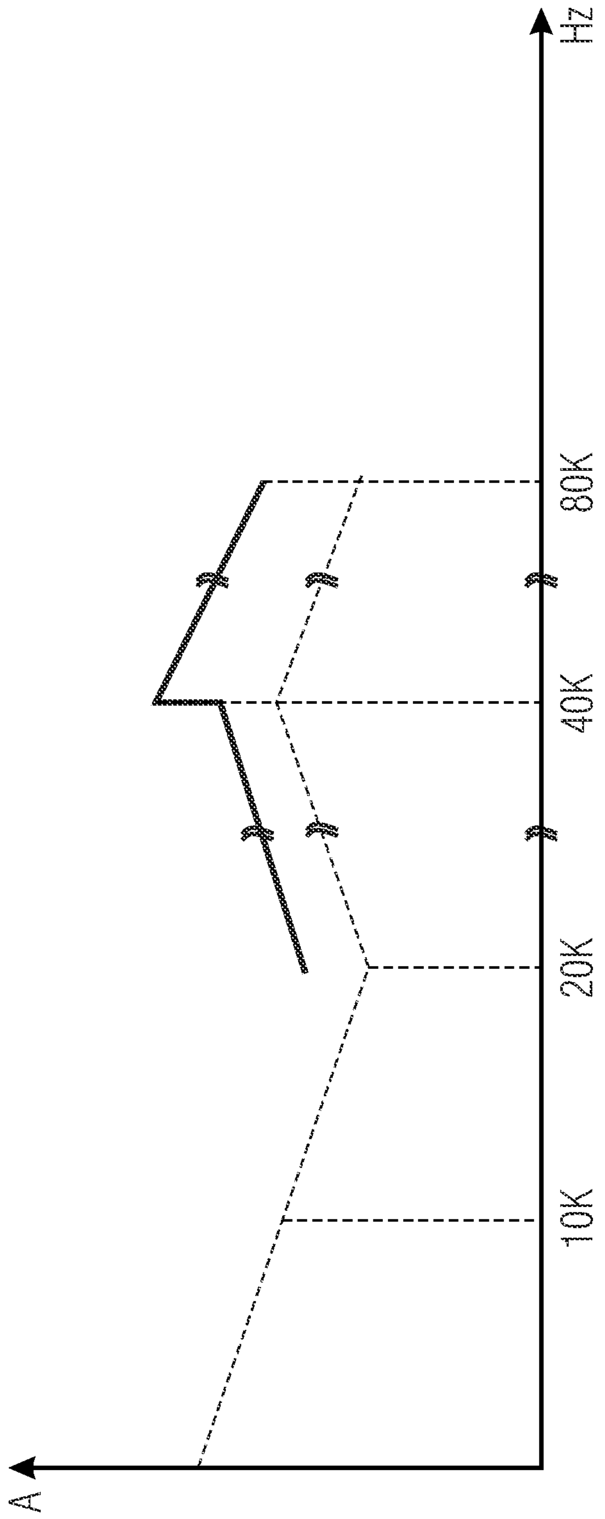
FIG. 5*b* shows a schematic illustration of an effect of a bandwidth extension stage according to a further embodiment.

While FIG. 5*a* shows a first implementation of the bandwidth extension, FIG. 5*b* shows a second implementation of the bandwidth extension, operating on the basis of the technique of "mirroring", i.e. mirroring the transposed spectral range at the cross-over frequency (transition frequency), which is advantageous in that in case of a non-constant signal progression in the baseband, as is illustrated in FIG. 5*b*, there is no discontinuity at the transposition location, i.e. at 20 kHz, if an amplification factor of 1 is used. Mirroring, or up-sampling, may be easily done in the time domain by introducing one or several zeroes as additional sample values into an audio signal between two sample values. If amplification is carried out, only a small discontinuity is created. This discontinuity can be left as is or, if required, it can be attenuated by using average values for the amplification factors in a certain spectral transition area.

Figure 6:
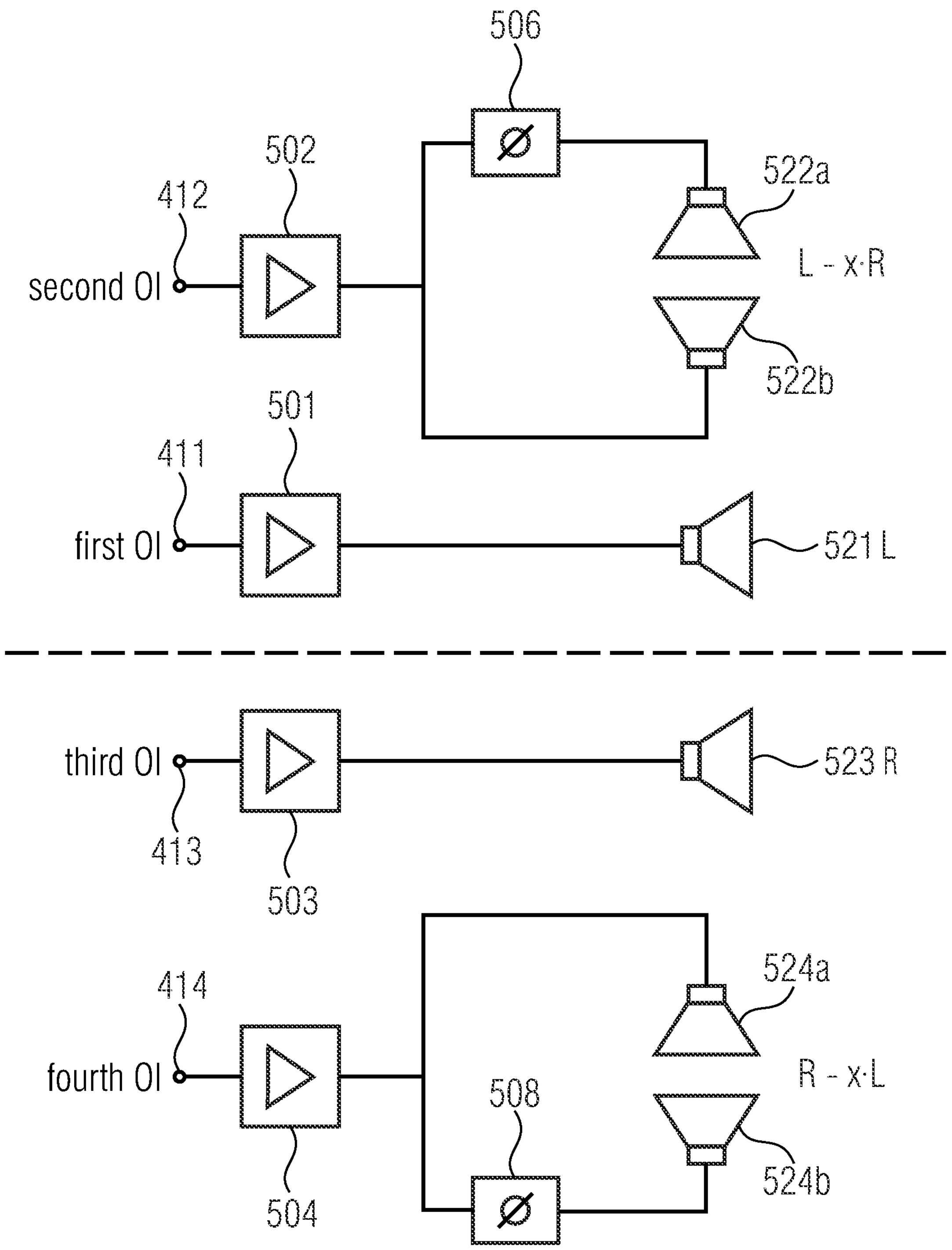
FIG. 6 shows a schematic illustration of the loudspeaker side of a loudspeaker system for a 2-channel output format.

FIG. 6 shows a loudspeaker system including a first transducer 521 for the first control signal 411 and a second transducer 522*a*, 522*b* for the second control signal 412. In addition, the loudspeaker system comprises a third transducer 523 for the third control signal 413 and a fourth transducer 524*a*, 524*b* for the fourth control signal 414. All control signals may be amplified by respective amplifiers 501, 502, 503, 504, e.g., in a manner as input by a user interface via a volume control. The transducers 521, 523 represent the translational and, so to speak, conventional transducers that, in contrast to normal transducers, are characterized by being able to output sound energy in the range above 20 kHz as well, where they advantageously are intended to emit up to 80 kHz or above. The decreasing efficiency at higher frequencies is compensated by the amplification due to the amplification members 407, 408.

Figure 7A:
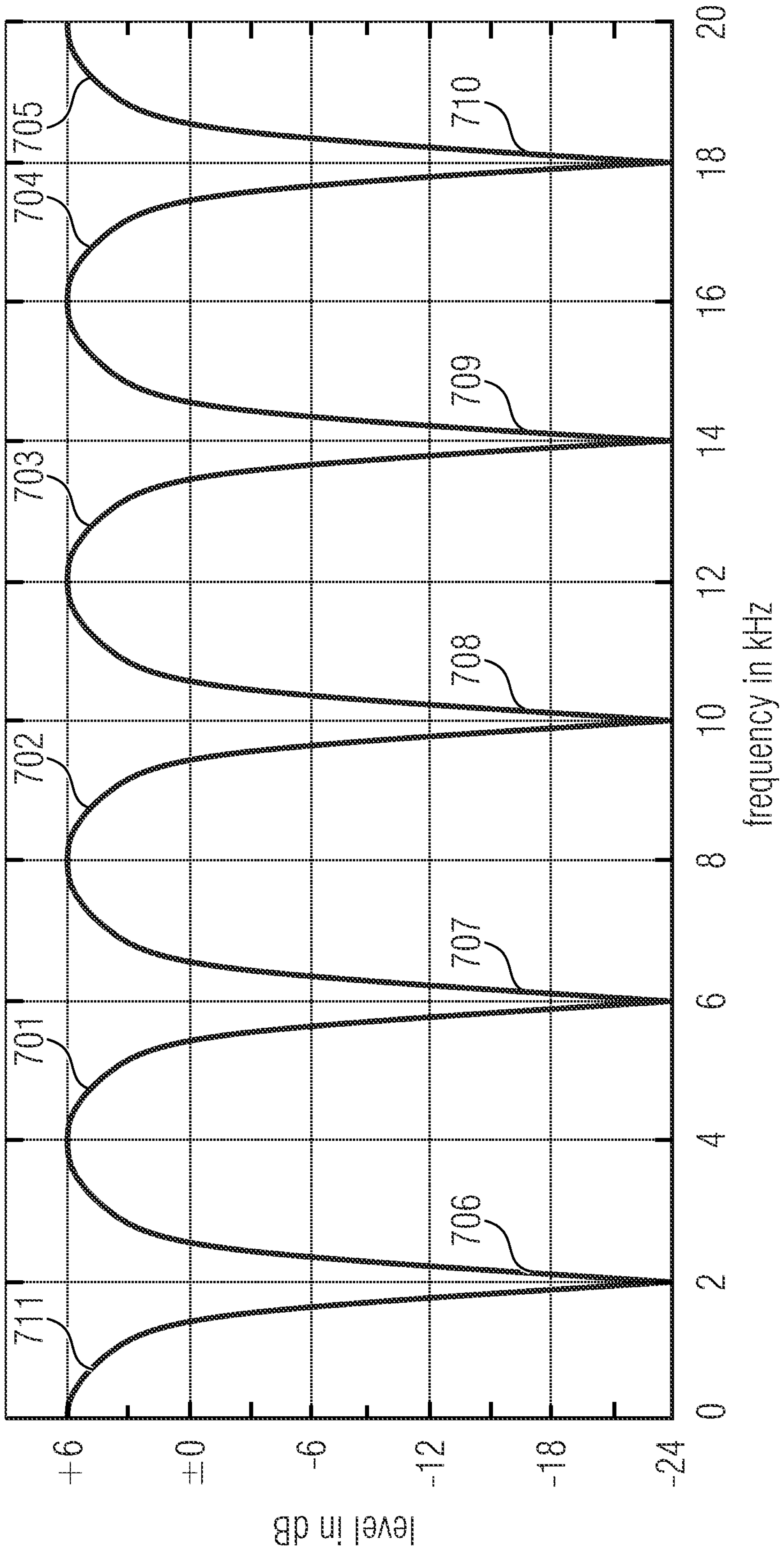
FIG. 7*a* shows an exemplary non-linear frequency response of a transducer with a comb filter effect.
Figure 7B:
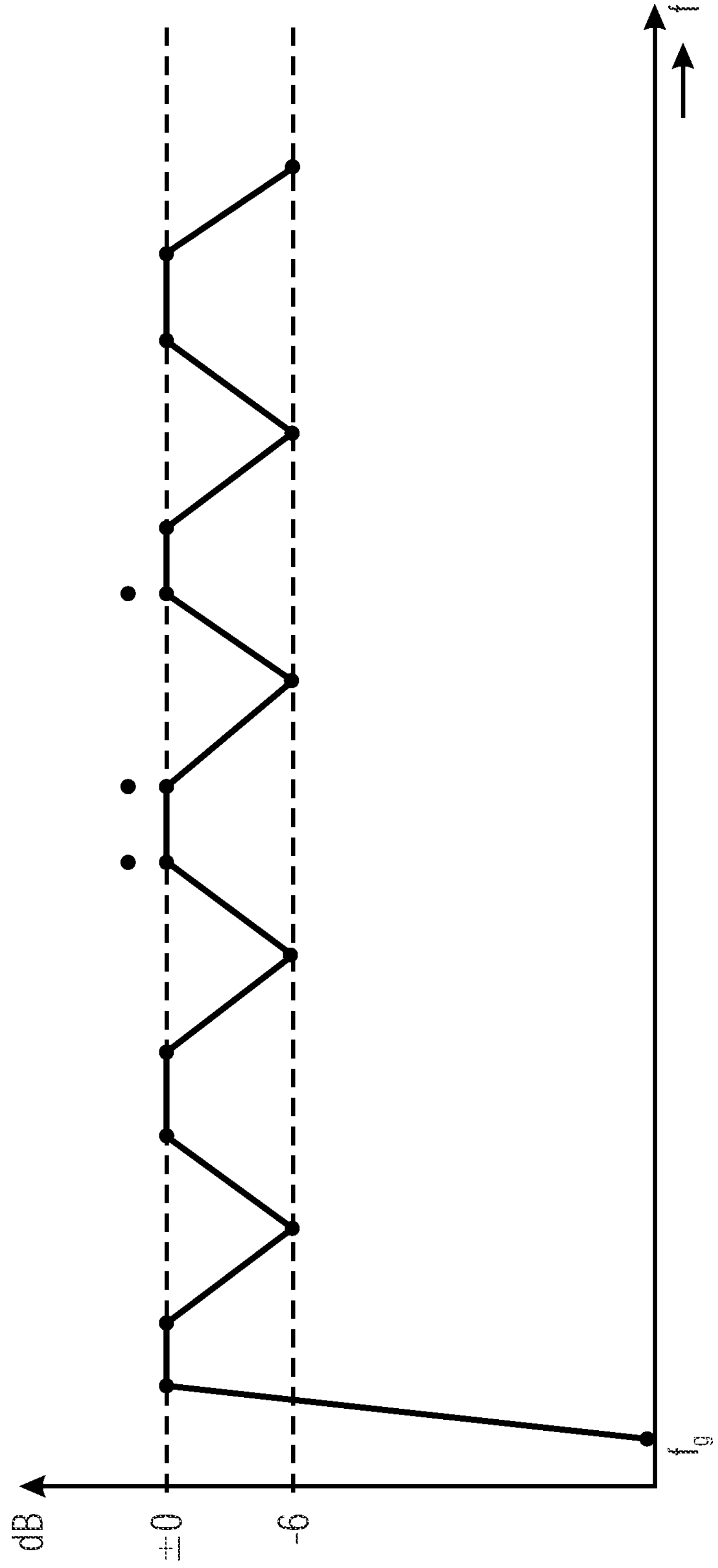
FIG. 7*b* shows a schematic frequency response of a linearization filter to at least partially linearize the frequency response of FIG. 7*a;*

In an advantageous embodiment illustrated in FIG. 6, the rotatory transducers 522*a*, 522*b*, or 524*a*, 524*b*, are implemented such that the transducers each include two individual transducers with a front side and a rear side, wherein the two front sides, as illustrated in FIG. 6, are directed towards each other. Between the front sides, i.e. between the membranes, there may be no distance or only such a distance that the membranes are able to deflect and generate, in the intermediate space between the membranes, sound that is able to exit along the edges of the membranes as a rotation. Such a transducer has a very good efficiency in the generation of rotating sound, i.e. a sound field with rotating sound particle velocity vectors. However, the frequency response is heavily non-linear. Thus, the linearization filter 303, 323 is provided to generate a signal via a "predistortion", so to speak, which, if it is output by the non-linear frequency response of the transducer 522*a*, 522*b*, or 524*a*, 524*b*, has a relative linear transmission characteristic or signal characteristic. FIG. 7*a* shows an exemplary spectrum as it may occur in transducers for rotatory signals. FIG. 7*b* shows an exemplary frequency response of the linearization filter 303, 323. In the advantageous implementation of the linearization filter, the overshoots 701, 702, 703, 704, 705 are lowered, whereas the indentations 706 to 710 are "left as is" so that, in the frequency ranges where the indentations are located, the frequency response of the linearization filter is at the 0 dB reference line and, in the range of the overshoots, the overshoots are at least partially lowered, that is by 6 dB if the overshoot itself has a height of 6 dB, as is illustrated in the exemplary frequency response in FIG. 7*a*. The linearization filter is further configured to provide a high-pass characteristic with respect to a cut-off frequency $f_g$, which is only schematically shown in FIG. 7*b* and which has a size of between 100 and 500 Hz and which is advantageously at 200 Hz. This means that the first overshoot 711 in FIG. 7*a* is fully attenuated.

FIG. 8*a* shows an alternative frequency response of a rotatory sound transducer, which may be created by the construction of the rotatory sound transducers as illustrated in FIG. 6. Strong overshoots and very strong plunges are shown. The linearization is particularly configured such that only the overshoots, which are shown in a hatched manner in FIG. 8*a*, are to be attenuated, whereas the plunges are approximately to be left as is. This leads to a frequency response of a linearization filter as illustrated in FIG. 8*b*. The entire "linearized" frequency response is schematically shown in FIG. 8*c*, where it can be seen that the linearized frequency response is not completely linearized, but when comparing FIG. 8*c* and FIG. 8*a*, it runs significantly more linearly, since the strong overshoots have been cut off.

It has been shown that strongly overshooting frequency ranges in the rotation signal have an interfering effect, whereas indentations in the rotation signal at certain tones, leading to certain tones in the rotation signal being "hidden", are not perceived to be interfering. Thus, the plunges in the frequency response of the loudspeakers, i.e. in FIG. 8*a* or 7*a*, do not have to be lifted. This simultaneously avoids that a signal still present in the attenuated indentation, which may also be an artefact signal, is too heavily amplified by strong amplification factors at certain frequencies. According to the invention, cutting off only the overshoots, or at least partially reducing the overshoots, and "leaving" the plunges, achieves a particularly efficient and high-quality means to provide the corresponding control signal for the rotatory sound transducer 522*a*, 522*b*, or 524*a*, 524*b*. Advantageously, corresponding phase shifters 506, 508 are built into the rotatory sound transducers, which, according to the implementation, provide a phase shift of 180°, however, which may be set to other values, which are advantageously between 150° and 210°. With respect to FIG. 3, it has been noted that the attenuation members 202, 222 may be set so as to obtain an approximate difference. This is illustrated in FIG. 6 at "L-x·R" and "R-x·L". If the corresponding attenuation member 202, 222 is set to an attenuation of zero, i.e. no attenuation at all, the factor x in FIG. 6 is equal to 1. However, if the attenuation member 202, 222 is set to a factor of half the attenuation, for example, the factor x is 0.5. However, if the attenuation member 202, 222 is set to full attenuation, the difference is no longer formed, and the first transducer 522*a*, 522*b* emits only the left signal. However, it is advantageous to set an attenuation of the attenuation member 202, 222 to a maximum of 0.25 so that the corresponding signal is a difference signal, even though, compared to the channel from which the subtraction is carried out, the subtracted channel is reduced with respect to its amplitude or power or energy.

In a further implementation, the apparatus for generating the first control signal and the second control signal, and in particular for generating the third and the fourth control signals, is implemented as a signal processor or software in order to generate the control signals for the individual loudspeakers, e.g. in a mobile device, such as a mobile telephone, and to then output them via a wireless interface. Alternatively, the transducers as illustrated in FIG. 6, including the amplifiers 502 to 504, are implemented together with the apparatus as illustrated in FIG. 1 into a loudspeaker unit that additionally includes the transducer 521 and the transducer 522*a*, 522*b* in a special carrier. Then, for example, this loudspeaker unit may be placed as it is at a left reproduction position with respect to a listening position. The same may be done for another loudspeaker unit including the elements 523, 524*a*, 524*b* as well as the corresponding part of the apparatus for generating the control signals so that a loudspeaker unit is provided for the right position with respect to a defined listening position. Accordingly, loudspeaker units may be used for further channels than the two stereo channels, e.g. for a center channel, for a left rear channel, for a right rear channel, in the case of a 5.1 system. In the case of higher systems, a transducer for rotatory sound and a transducer for translational sound that are driven with the separate control signals may be used at corresponding further positions, such as a ceiling loudspeaker.

A advantageous embodiment of the present invention is located within a mobile telephone. In particular, the control apparatus is loaded as a hardware element or as an app, or program, on the mobile telephone. The mobile telephone is configured to receive the first audio signal and the second audio signal or the multi-channel signal from any source that may be local or in the internet, and to generate the control signals depending thereon. These signals are transmitted by the mobile telephone to the sound generator with the sound generator elements either in a wired or wireless manner, e.g. by means of Bluetooth or Wi-Fi. In the latter case, the sound generating elements have to have a battery supply, or a power supply in general, in order to achieve the corresponding amplifications for the wireless signals received, e.g. according to the Bluetooth format or the Wi-Fi format.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for generating a first control signal for a first transducer and a second control signal for a second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over frequency of the second transducer, and wherein the output interface comprises a bandwidth extension stage to convert at least a part of a spectrum of the first audio signal or the combination signal in a frequency range above 35 kHz using an amplification factor of greater than or equal to 1 to acquire the first control signal comprising the frequency range above 35 kHz.

2. Apparatus according to claim 1, wherein the signal combiner comprises a phase shifter and an adder or a subtractor to determine the combination signal.

3. Apparatus according to claim 1, wherein the signal combiner comprises an attenuation member to attenuate the second audio signal, wherein the approximate difference is formed from the attenuated second audio signal.

4. Apparatus according to claim 1, wherein the bandwidth extension stage is configured to convert the at least one part of the spectrum of the first audio signal by using a harmonic transposition in the frequency range above 20 kHz, wherein the harmonic transposition comprises at least an even-numbered transposition factor equal to 2 or more.

5. Apparatus according to claim 1, wherein the signal manipulator is configured to delay the combination signal such that the Haas effect occurs at a listening position when simultaneously outputting the first control signal by means of the first transducer and the second control signal by means of the second transducer.

6. Apparatus according to claim 1, wherein the signal manipulator is configured to implement a delay of between 10 ms and 40 ms.

7. Apparatus according to claim 1, wherein the signal manipulator comprises a linearization filter configured to reduce or eliminate overshoots in a first set of frequencies due to non-linearity of the second transducer.

8. Apparatus according to claim 7, wherein the linearization filter is configured to not amplify a cancelation in a second set of frequencies, or to amplify it less than it would be required for a full linearization of the cancelation.

9. Apparatus according to claim 1, wherein the signal manipulator comprises the linearization filter configured to comprise a high-pass characteristic and to attenuate signal components of the combination signal below a high-pass cut-off frequency.

10. Apparatus according to claim 9, wherein the high-pass cut-off frequency is in the range of 180 to 250 Hz.

11. Apparatus according to claim 1, wherein the signal combiner is configured to generate from the first audio signal and the second audio signal or from the combination signal a further combination signal that is different from the combination signal, wherein the signal manipulator is configured to manipulate the further combination signal to acquire the fourth control signal, and wherein the output interface is configured to output or store the fourth control signal or a third control signal based on the second audio signal.

12. Apparatus according to claim 11, wherein the signal manipulator is configured to delay the further combination signal or to amplify or attenuate the further combination signal in a frequency-selective manner to counteract a non-linear transducer characteristic over frequency of a fourth transducer, or wherein the output interface is configured to convert at least a part of a spectrum of the second audio signal in a frequency range above 20 kHz to acquire the third control signal.

13. Apparatus for generating a first control signal for a first transducer and a second control signal for a second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal combiner is configured to subtract the second audio signal from the first audio signal in the time domain to acquire the combination signal, wherein the signal manipulator comprises:

a delay stage configured to delay the combination signal, a linearization filter configured to amplify or attenuate the combination signal in a frequency-selective manner to at least partially linearize the non-linear transducer characteristic over frequency of the second transducer, and an attenuation member to attenuate a level of the combination signal, and wherein the output interface comprises a bandwidth extension stage to convert at least a part of a spectrum of the first audio signal in a frequency range above 20 kHz using an amplification factor greater than or equal to 1 to acquire the first control signal comprising the frequency range above 20 kHz.

14. Apparatus for generating a first control signal for a first transducer and a second control signal for a second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal combiner is configured to subtract the first audio signal from the second audio signal in the time domain to acquire a further combination signal, wherein the signal manipulator is configured to manipulate the further combination signal to acquire a fourth control signal for a fourth transducer, and comprises:

a delay stage configured to delay the further combination signal, a linearization filter to at least partially linearize a non-linear transducer characteristic over frequency of the fourth transducer, and an attenuation member to attenuate a level of the further combination signal, and wherein the output interface is configured to output or store a third control signal for a third transducer based on the second audio signal or the fourth control signal and comprises a bandwidth extension stage to convert at least a part of a spectrum of the second audio signal in a frequency range above 20 kHz using an amplification factor of greater than or equal to 1 to acquire the third control signal.

15. Apparatus for generating a first control signal for a first transducer and a second control signal for a second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over frequency of the second transducer, wherein the input interface is configured to acquire a first reception audio signal or a second reception audio signal, and wherein the input interface comprises a bandwidth extension stage to convert at least a part of a spectrum of the first reception audio signal or the second reception audio signal in a frequency range above 20 kHz using an amplification factor of greater than or equal to 1 to acquire the first audio signal or the second audio signal.

16. Apparatus for generating a first control signal for a first transducer and a second control signal for a second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over frequency of the second transducer, and wherein the signal manipulator comprises:

a bandwidth extension stage to convert at least a part of a spectrum of the combination signal or a signal derived from the combination signal in a frequency range above 20 kHz using an amplification factor greater than or equal to one to acquire a manipulated signal the second control signal is based on.

17. Loudspeaker system, comprising:

a first transducer, a second transducer, a third transducer, and a fourth transducer; and an apparatus for generating a first control signal for the first transducer and a second control signal for the second transducer, comprising:

an input interface for providing a first audio signal for a first audio channel and a second audio signal for a second audio channel;

a signal combiner for determining from the first audio signal and the second audio signal a combination signal comprising an approximate difference of the first audio signal and the second audio signal;

a signal manipulator for manipulating the combination signal to acquire the second control signal; and an output interface for outputting or storing the first control signal based on the first audio signal, or the second control signal, wherein the signal manipulator is configured to delay the combination signal or to amplify or attenuate the combination signal in a frequency-selective manner to counteract a non-linear transducer characteristic over frequency of the second transducer, or wherein the apparatus is configured to convert at least a part of a spectrum of the first audio signal or the combination signal in a frequency range above 20 kHz to acquire the first control signal comprising the frequency range above 20 kHz, wherein the apparatus for generating is configured to:

generate the first control signal for the first transducer by using the first audio signal, generate the second control signal for the second transducer by using the combination signal, generate a third control signal for the third transducer by using the second audio signal, and generate a fourth control signal for the fourth transducer by using a further combination signal, wherein the first transducer and the third transducer are configured to generate a translational sound signal, and wherein the second transducer and the fourth transducer are configured to generate a rotatory sound signal.

18. Loudspeaker system according to claim 17, wherein the first transducer and the second transducer are arranged at a first position with respect to a listening position, wherein the first position is determined by the first audio channel, wherein the third transducer and the fourth transducer are arranged at a second position with respect to the listening position, wherein the second position differs from the first position and is determined by the second audio channel.

19. Loudspeaker system according to claim 17, wherein the second transducer or the fourth transducer comprises:

a first sound generator with a first membrane and a first front side and a first rear side, a second sound generator with a second membrane and a second front side and a second rear side, wherein the first sound generator and the second sound generator are arranged with respect to each other such that the first front side and the second front side are directed towards each other, and wherein the first sound generator and the second sound generator may be fed with the second audio signal and the fourth audio signal, respectively.

20. Loudspeaker system according to claim 19, wherein the second transducer and the fourth transducer each comprises a phase shifter to introduce a phase difference between a first feed signal for the first sound generator and a second feed signal for the second sound generator.

21. Loudspeaker system according to claim 20, wherein the phase shifter is configured to generate a phase angle of between 150° and 210°.

22. Loudspeaker system according to claim 17, wherein the second transducer comprises a frequency response that is non-linear, and wherein the signal manipulator is configured to at least partially linearize the second frequency response when generating the second audio signal, or wherein the fourth transducer comprises a fourth frequency response that is non-linear, and wherein the signal manipulator is configured to at least partially linearize the fourth frequency response when generating the fourth control signal.

23. Method for generating a first control signal for a first transducer and a second control signal for a second transducer, comprising:

providing a first audio signal for a first audio channel and a second audio signal for a second audio channel;

determining from the first audio signal and the second audio signal a combination signal comprising an approximate difference of the first audio signal and the second audio signal;

manipulating the combination signal to acquire the second control signal; and outputting or storing the first control signal based on the first audio signal, or the second control signal, wherein the manipulating comprises delaying the combination signal or amplifying or attenuating the combination signal in a frequency-selective manner to counteract a non-linear transducer characteristic over frequency of the second transducer, and wherein the outputting or storing comprises converting at least a part of a spectrum of the first audio signal or the combination signal in a frequency range above 20 kHz using an amplification factor of greater than or equal to 1 to acquire the first control signal comprising the frequency range above 20 kHz, or wherein the determining comprises subtracting the second audio signal from the first audio signal in the time domain to acquire the combination signal, wherein the manipulating comprises:

delaying the combination signal, amplifying or attenuating the combination signal in a frequency-selective manner to at least partially linearize the non-linear transducer characteristic over frequency of the second transducer, and attenuating a level of the combination signal, and wherein the outputting or storing comprises converting at least a part of a spectrum of the first audio signal in a frequency range above 20 kHz using an amplification factor greater than or equal to 1 to acquire the first control signal comprising the frequency range above 20 kHz, or wherein the determining comprises subtracting the first audio signal from the second audio signal in the time domain to acquire a further combination signal, and wherein the manipulating comprises manipulating the further combination signal to acquire a fourth control signal for a fourth transducer, comprising:

delaying the further combination signal, at least partially linearizing a non-linear transducer characteristic over frequency of the fourth transducer, and attenuating a level of the further combination signal, and wherein the outputting or storing comprises converting at least a part of a spectrum of the second audio signal in a frequency range above 20 kHz using an amplification factor of greater than or equal to 1 to acquire a third control signal for a third transducer, outputting or storing the third control signal, and outputting or storing the fourth control signal, or wherein the manipulating comprises delaying the combination signal or amplifying or attenuating the combination signal in a frequency-selective manner to counteract a non-linear transducer characteristic over frequency of the second transducer, wherein the input interface is configured to acquire a first reception audio signal or a second reception audio signal, and wherein the providing comprises converting at least a part of a spectrum of the first reception audio signal or the second reception audio signal in a frequency range above 20 kHz using an amplification factor of greater than or equal to 1 to acquire the first audio signal or the second audio signal, or wherein the manipulating comprises delaying the combination signal or amplifying or attenuating the combination signal in a frequency-selective manner to counteract a non-linear transducer characteristic over frequency of the second transducer, and wherein the manipulating comprises converting at least a part of a spectrum of the combination signal or a signal derived from the combination signal in a frequency range above 20 kHz using an amplification factor greater than or equal to one to acquire a manipulated signal the second control signal is based on.

24. Method according to claim 23, comprising:

measuring the non-linear transducer characteristic over frequency of the second transducer;

calculating a linearization filter to at least partially linearize the non-linear transducer characteristic over the-frequency of the second transducer to acquire a calculated linearization filter; and using the calculated linearization filter to amplify or attenuate the combination signal in a frequency-selective manner.

25. A non-transitory digital storage medium having a computer program stored thereon to perform, when said computer program is run by a computer, the method for generating a first control signal for a first transducer and a second control signal for a second transducer, the method comprising:

providing a first audio signal for a first audio channel and a second audio signal for a second audio channel;

determining from the first audio signal and the second audio signal a combination signal comprising an approximate difference of the first audio signal and the second audio signal;

manipulating the combination signal to acquire the second control signal; and outputting or storing the first control signal based on the first audio signal, or the second control signal, wherein the manipulating comprises delaying the combination signal or amplifying or attenuating the combination signal in a frequency-selective manner to counteract a non-linear transducer characteristic over frequency of the second transducer, and wherein the outputting or storing comprises converting at least a part of a spectrum of the first audio signal or the combination signal in a frequency range above 20 kHz using an amplification factor of greater than or equal to 1 to acquire the first control signal comprising the frequency range above 20 kHz, or wherein the determining comprises subtracting the second audio signal from the first audio signal in the time domain to acquire the combination signal, wherein the manipulating comprises:

delaying the combination signal, amplifying or attenuating the combination signal in a frequency-selective manner to at least partially linearize the non-linear transducer characteristic over frequency of the second transducer, and attenuating a level of the combination signal, and wherein the outputting or storing comprises converting at least a part of a spectrum of the first audio signal in a frequency range above 20 kHz using an amplification factor greater than or equal to 1 to acquire the first control signal comprising the frequency range above 20 kHz, or wherein the determining comprises subtracting the first audio signal from the second audio signal in the time domain to acquire a further combination signal, and wherein the manipulating comprises manipulating the further combination signal to acquire a fourth control signal for a fourth transducer, comprising:

delaying the further combination signal, at least partially linearizing a non-linear transducer characteristic over frequency of the fourth transducer, and attenuating a level of the further combination signal, and wherein the outputting or storing comprises converting at least a part of a spectrum of the second audio signal in a frequency range above 20 kHz using an amplification factor of greater than or equal to 1 to acquire a third control signal for a third transducer, outputting or storing the third control signal, and outputting or storing the fourth control signal, or wherein the manipulating comprises delaying the combination signal or amplifying or attenuating the combination signal in a frequency-selective manner to counteract a non-linear transducer characteristic over frequency of the second transducer, wherein the input interface is configured to acquire a first reception audio signal or a second reception audio signal, and wherein the providing comprises converting at least a part of a spectrum of the first reception audio signal or the second reception audio signal in a frequency range above 20 kHz using an amplification factor of greater than or equal to 1 to acquire the first audio signal or the second audio signal, or wherein the manipulating comprises delaying the combination signal or amplifying or attenuating the combination signal in a frequency-selective manner to counteract a non-linear transducer characteristic over frequency of the second transducer, and wherein the manipulating comprises converting at least a part of a spectrum of the combination signal or a signal derived from the combination signal in a frequency range above 20 kHz using an amplification factor greater than or equal to one to acquire a manipulated signal the second control signal is based on.

* * * * *